July 7, 1964    V. C. WARDELL    3,139,665
APPARATUS FOR MANUFACTURING ELASTIC TIES AND THE LIKE
Filed Jan. 29, 1960    7 Sheets-Sheet 1
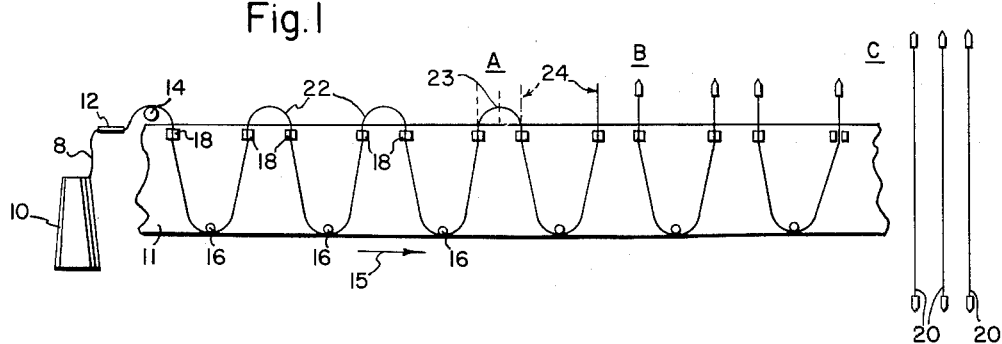
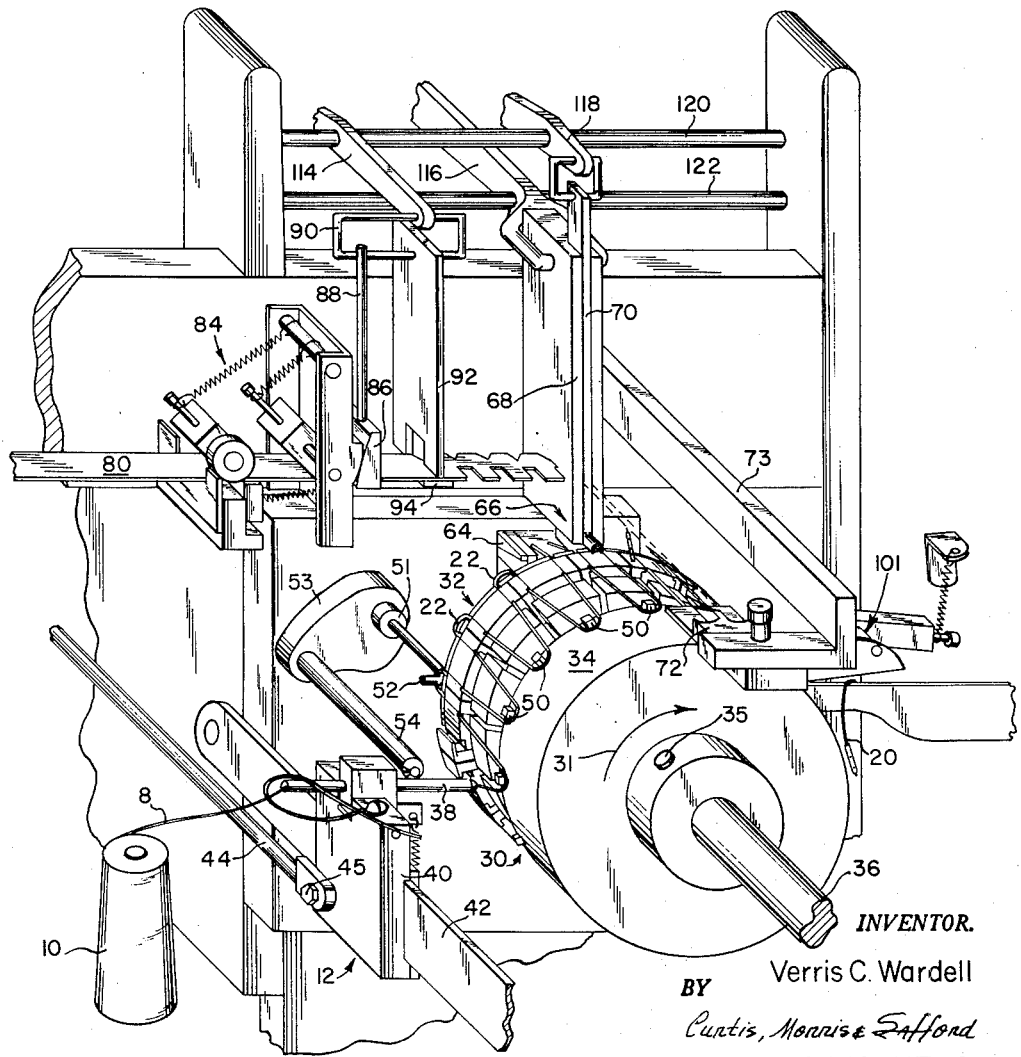
INVENTOR.
Verris C. Wardell
BY
Curtis, Morris & Safford
ATTORNEYS July 7, 1964 V. C. WARDELL 3,139,665
APPARATUS FOR MANUFACTURING ELASTIC TIES AND THE LIKE
Filed Jan. 29, 1960 7 Sheets-Sheet 2

INVENTOR.
Verris C. Wardell
BY
Curtis, Morris & Safford
ATTORNEYS

INVENTOR.
Verris C. Wardell
BY
Curtis, Morris, & Safford
ATTORNEYS

July 7, 1964    V. C. WARDELL    3,139,665
APPARATUS FOR MANUFACTURING ELASTIC TIES AND THE LIKE
Filed Jan. 29, 1960    7 Sheets-Sheet 5

INVENTOR.
Verris C. Wardell
BY
Curtis, Morris, & Safford
ATTORNEYS

July 7, 1964 V. C. WARDELL 3,139,665
APPARATUS FOR MANUFACTURING ELASTIC TIES AND THE LIKE
Filed Jan. 29, 1960 7 Sheets-Sheet 6

INVENTOR.
Verris C. Wardell
BY
Curtis, Morris, & Safford
ATTORNEYS

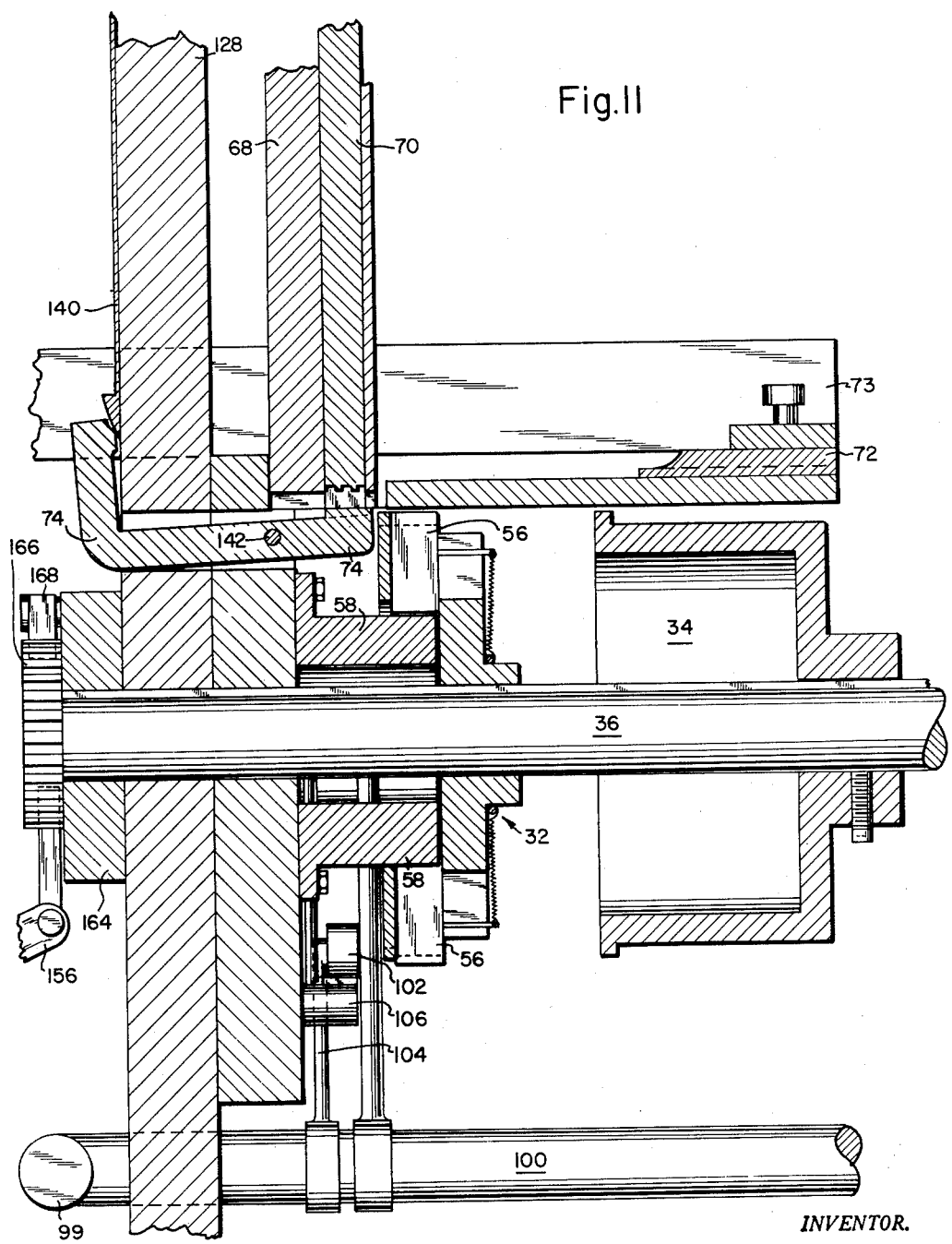

United States Patent Office 3,139,665
Patented July 7, 1964

3,139,665
APPARATUS FOR MANUFACTURING ELASTIC
TIES AND THE LIKE
Verris C. Wardell, 1 New York Ave.,
Rockville Centre, N.Y.
Filed Jan. 29, 1960, Ser. No. 5,508
2 Claims. (Cl. 29—33)

This invention relates to apparatus for making elastic fastening ties such as may be used to secure objects to display cards and the like.

An object of this invention is to provide a greatly improved apparatus for making elastic fastening ties and the like on a mass production basis.

Another object of this invention is to provide a high speed, inexpensive apparatus for fabricating such articles.

A further object is to provide a way of making such articles to insure uniformly high quality and to give a minimum of rejects or defective articles.

Other objects will be pointed out in or understood from the description given hereinafter.

The elastic fastening ties produced by the present invention comprise a length of elastic cord, such as a fabric covered rubber strand, having a stiff tip firmly attached to each end thereof. The tips are adapted to act as barbs so that they can be inserted through a piece of material and thereafter anchor the ends of the cord to the material.

Elastic fastening ties of this sort have many and varied uses. They are used on women's hats to secure it to the head of the wearer. They are also used on costume masks, and are used extensively in holding relatively small objects such as cigarette lighters, lipsticks, and so forth, to display cards whereon the articles are held firmly by the ties but may be removed easily due to the elasticity of the cord. Generally speaking these ties may be used in many different applications where it is desired to secure an object in a given position while allowing for easy removal of the object.

The present invention provides apparatus for making elastic fastening ties at an extremely fast rate. Now in order to achieve a high rate of production it is necessary, of course, that the elastic cord stock be handled rapidly. However, complicating this requirement is the fact that this cord material stretches so easily thus making it difficult to measure it accurately and cut it into uniform segments. Also any twisting of the cord in handling it will result in the formation of kinks in the cord.

Previously these elastic ties have been for the most part made by cutting the cord into segments by hand and attaching the tips or barbs by means of a manually operated press. This way was not only slow and expensive, but the elastic fastening ties so produced were of poor quality and uneven length. The present invention provides a great improvement over this previous way of production.

In accordance with the present invention in one specific embodiment thereof a continuous length of elastic cord is formed with folds in zig-zag shape upon a reel which rotates continuously step-by-step. The reel has fingers adapted to receive the folds of the cord and retain them in precise position and with highly accurate length while the reel rotates. Because the elastic cord is wound entirely in zig-zag fashion, kinks and twisting are avoided. Moreover, a low uniform winding tension can be used so that the finally-produced ties will all be of the same length. The folds of the cord are carried by the reel successively past a number of operating stations, namely a cord cutting station, a tip or barb attaching station, and a tie removing station. At the cord cutting station a scissors cuts the cord at the midpoint of each successive fold thus forming separate U-shaped cord segments of equal length. The ends of these segments, projecting straight out from the reel, are then brought to the tip attaching station where a tip or barb is attached to each end in succession. Since each cord end projects in the same direction, each barb is applied while oriented in the same direction, and a single barb applying mechanism suffices. No auxiliary handling of the cord segment is required since its ends are already properly oriented for this single mechanism. The segments with barbs attached are held by the reel until they reach the tie removing station where they are released and ejected to an accumulating zone. The machine may be set to produce any desired length of elastic tie by simple adjustments and the ties produced are of closely uniform length and of high quality. This apparatus is relatively simple and handles the elastic cord gently in such a manner that it is neither twisted nor unduly stretched, thus providing rapid trouble-free operation.

A fuller understanding of the above outlined invention together with a better appreciation of its many advantages will best be gained from the following detailed description given in connection with the accompanying drawings in which:

FIGURE 1 is a schematic view illustrating the present invention;

FIGURE 2 is a perspective view of the front of apparatus embodying the invention, some portions of the apparatus being cut away to show hidden parts;

FIGURE 11 is a cross section of the machine taken as indicated by line 11—11 in FIGURE 9.

Figure 3:
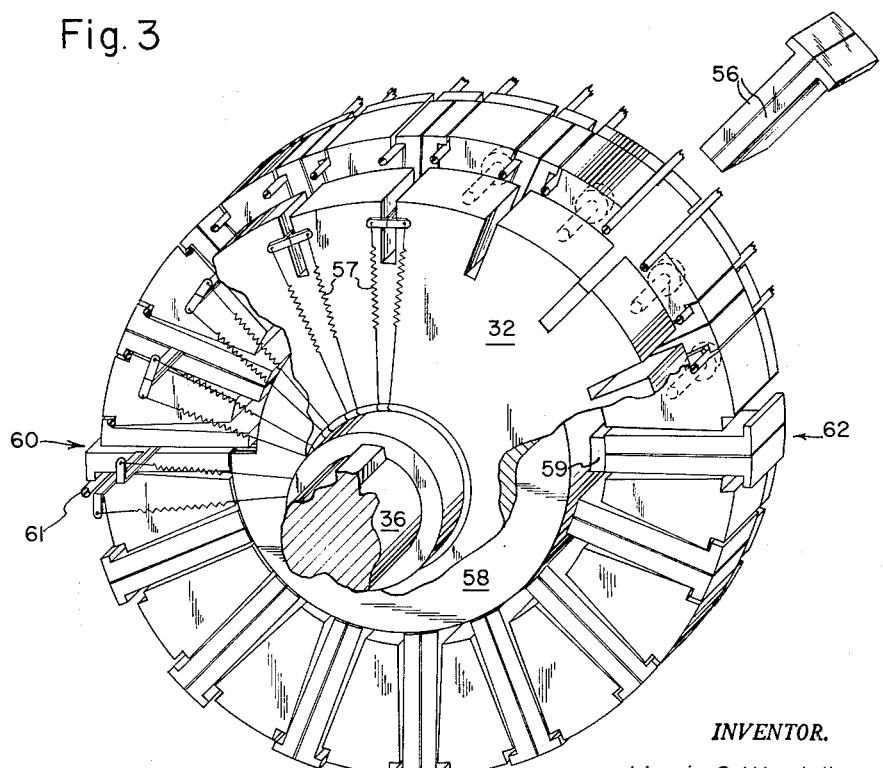
FIGURE 3 is a perspective view of the cord holding reel, with portions cut away, showing the operation of the gripper fingers in engaging and holding successive folds of the elastic cord on the reel.

FIGURE 1 shows a schematic representation of the invention and is not intended to represent any particular apparatus. As shown herein, a longitudinally movable form or support 11 is arranged to receive a continuous length of elastic cord 8 in sinuous or zig-zag form. The elastic cord is supplied from a storage spool 10 and wound onto form 11 by means of a cord guide 12 which moves laterally back and forth while form 11 moves longitudinally in the direction of arrow 15. Affixed to the movable form 11, on one side thereof, is a column of spaced finger-like posts 16 and, on the opposite side of the form, a parallel column of cord grippers 18, there being two grippers for each post, as shown. As the form moves ahead cord guide 12 moves back and forth across it in timed relation so that the elastic cord is wound first around a post 16, across the form and under a gripper 18, around a temporarily present post or finger 14, and then back under the next gripper 18 and finally back around the next finger 16, thus forming the elastic cord into a continuous series of zig-zag folds on the moving form. Each portion of the elastic cord wound on form 11 is retained by the grippers in the form of a loop 22 extending beyond the top edge of the form. During the forming of each loop 22, finger 14 temporarily occupies the position shown and is then for an instant withdrawn downward to permit the loop to move ahead.

The extending loops 22 are moved in succession to a shear or cutting station, generally indicated at A, where the elastic cord is cut at the midpoint 23 of each loop portion. As soon as each loop is cut, its two free ends 24 spring outward, as indicated by the broken lines at station A. Thus these ends automatically align themselves parallel in proper position for receiving the barbs or tips. These ends 24, extending straight outward from form 11 are next to a tip attaching station B where a metal tip or barb is attached to each cord end. Finally, at ejecting station C, the completed ties 20 are removed from form 11.

FIGURE 2 is a perspective view of the front of a machine particularly suited for carrying out the method described above. Here elastic cord 8 is wound on a rotating circular reel 30 (equivalent to form 11) in a sinuous form, as described above, with its loop portions 22 extending beyond the inner side of the reel. Each loop 22 is rotated step-by-step on the reel to a scissors 64 where the loop is cut at its midpoint. Next, each severed piece of elastic cord, in the form of a plurality of U-shaped segments with ends aligned extending straight out from the reel, is brought to a tip forming and attaching mechanism, indicated generally at 66, where metal tips are attached to the ends of the cord segments. The metal tips are formed from a continuous length of strip metal 80 which is fed between a punch 92 and a die 94 and to a shear 68 at precisely timed intervals in relation to the step-by-step revolution of reel 30. The metal tips are sheared from the metal strip 80 and formed and attached to the individual cord ends in one operation of the tip forming and attaching mechanism 66, the operation of which will be more fully described hereinafter.

After the tips have been attached to the cord ends, reel 30, moving in a step at a time, carries the finished ties to a cord removing mechanism indicated generally at 101. At this point the finished elastic fastening ties 20 are removed from the reel and fed to an accumulating zone.

The elastic cord 8 is wound upon reel 30 with the coaction of guide mechanism 12, including a hollow tube 38, and the reel 30. As the reel 30 is stepped intermittently in a clockwise direction, as indicated by arrow 31, the elastic cord is wound onto the reel by the back and forth reciprocating motion of guide 12 and tube 38. As can be seen in FIGURE 2, the cord is looped alternately around one of the post fingers 50 (equivalent to fingers 16) and a dancer finger 52 (equivalent to finger 14) so that it is wound on the reel 30 in a sinuous configuration. The cord is held in this position as the reel revolves by the operation of the grippers 56 (see also FIGURE 3).

The winding of the cord on the reel takes place, as seen in FIGURE 2, in the following sequence of operations. As the cord guide 12 reaches its farthest forward movement the end of guide tube 38 is positioned at a point just above and forward of a post finger 50. At this point the reel begins to step a portion of a clockwise revolution so that as the cord guide starts its backward stroke it moves behind the post finger forming the cord into a loop around it. As the cord guide 12 proceeds in its backward stroke the guide tube 38, which is pivoted, engages a pin or bouncer 54 which deflects the guide tube upward so that the cord passes under a first raised gripper 56'. This first gripper at the next movement of the reel, will close down and engage the elastic cord.

Now, as the cord guide 12 reaches the point of its farthest backward movement, the end of the pivoted guide tube 38 is positioned at a point just above and rearward of the dancer finger 52. At this point the reel is stepped a portion of a clockwise revolution so that as the cord guide 12 starts its forward stroke the elastic cord will be looped around the dancer finger 52 and under the second following, still raised, gripper 56'. As the reel rotates the first raised gripper 56', closes, as shown in FIGURE 3, and the second raised gripper 56" receives the cord. The second raised gripper 56" will close at the next rotation of the reel and will hold the cord in the newly formed loop 22 securely to the reel. Immediately thereafter another open pair of grippers is moved into position to engage the next fold of cord 8. Upon reaching the end of its forward stroke, guide tube 38 will loop the cord around the next finger 50, as described above, and repeat the same sequence of motions previously described.

Figure 8:
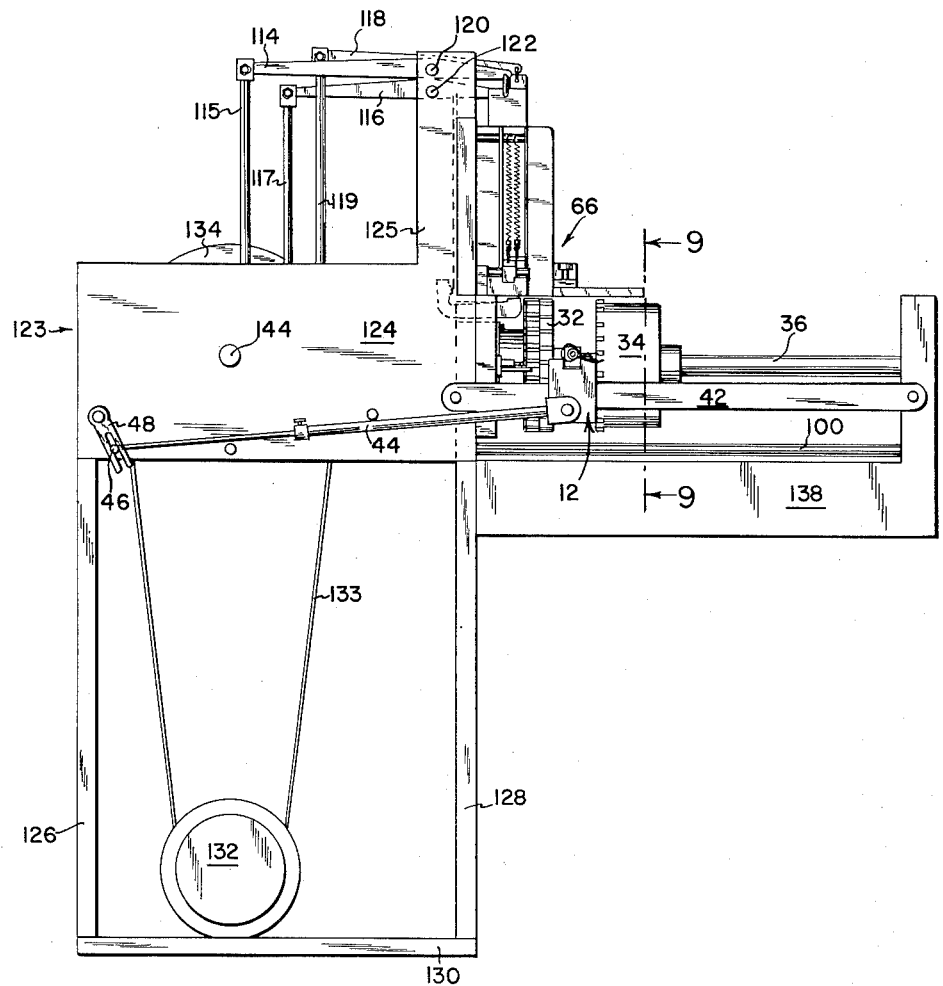
FIGURE 8 is a side view of the entire machine.

The cord guide 12 comprises a slide or carriage 40 which is adapted for back-and-forth sliding movement on a rail 42. Pivotally mounted on slide 40 is guide tube 38 through which the elastic cord feeds as it is wound onto reel 30. The cord guide is caused to slide forward and backward in a reciprocating motion on rail 42 in synchronism with the movement of reel 30 by the connecting rod 44 which is pivotally attached to the cord guide slide at 46. The other end of the connecting rod 44, shown only in FIGURE 8, is attached to a crank 48. As more fully described hereinafter, the connecting rod 44 and the crank 48 are adapted to be adjusted to provide any desired stroke of the cord guide 12 to set the machine for making a different length of tie.

An important advantage in the above outlined cord feeding arrangement is that the elastic cord unwinds directly from the storage spool, moves freely through the cord guide and is wound onto the reel with low, uniform tension and no twisting. Thus, the length of each cord segment is easily controlled to very close tolerances. Moreover, simply by adjusting the thickness or width of the reel, and the throw of guide 12, ties of different lengths within a wide range can be produced. An actual machine substantially identical to the one disclosed herein, which has been built is able to produce elastic ties continuously at a rate of about 10,000 per hour with only several defective ties to a thousand good ones. Moreover, the machine is inherently self-clearing so that when a defective tie occurs, it will usually be disposed of without jamming the machine.

Another important advantage of this arrangement lies in the ease with which the length of the fastening ties can be varied. It can be seen that the length of the fastening ties will be approximately twice the distance between the post fingers 50 and the dancer finger 52. This distance can easily be varied by the operation of a set screw 35, located on the collar of the post finger wheel 34 (i.e. the front half of reel 30), normally set engaging shaft 36. Disengagement of the set screw 35 renders the post finger wheel 34 slideable on shaft 36. Thus, by positioning the post finger wheel 34 at the desired distance from the gripper wheel 32 (the rear half of reel 30) the length of the fastening ties which the machine will produce is established. The stroke of the cord guide 12 can then be adjusted to correspond to the lateral dimension of the cord reel 30, i.e. the lateral distance between posts 50 and grippers 56.

Figure 9:
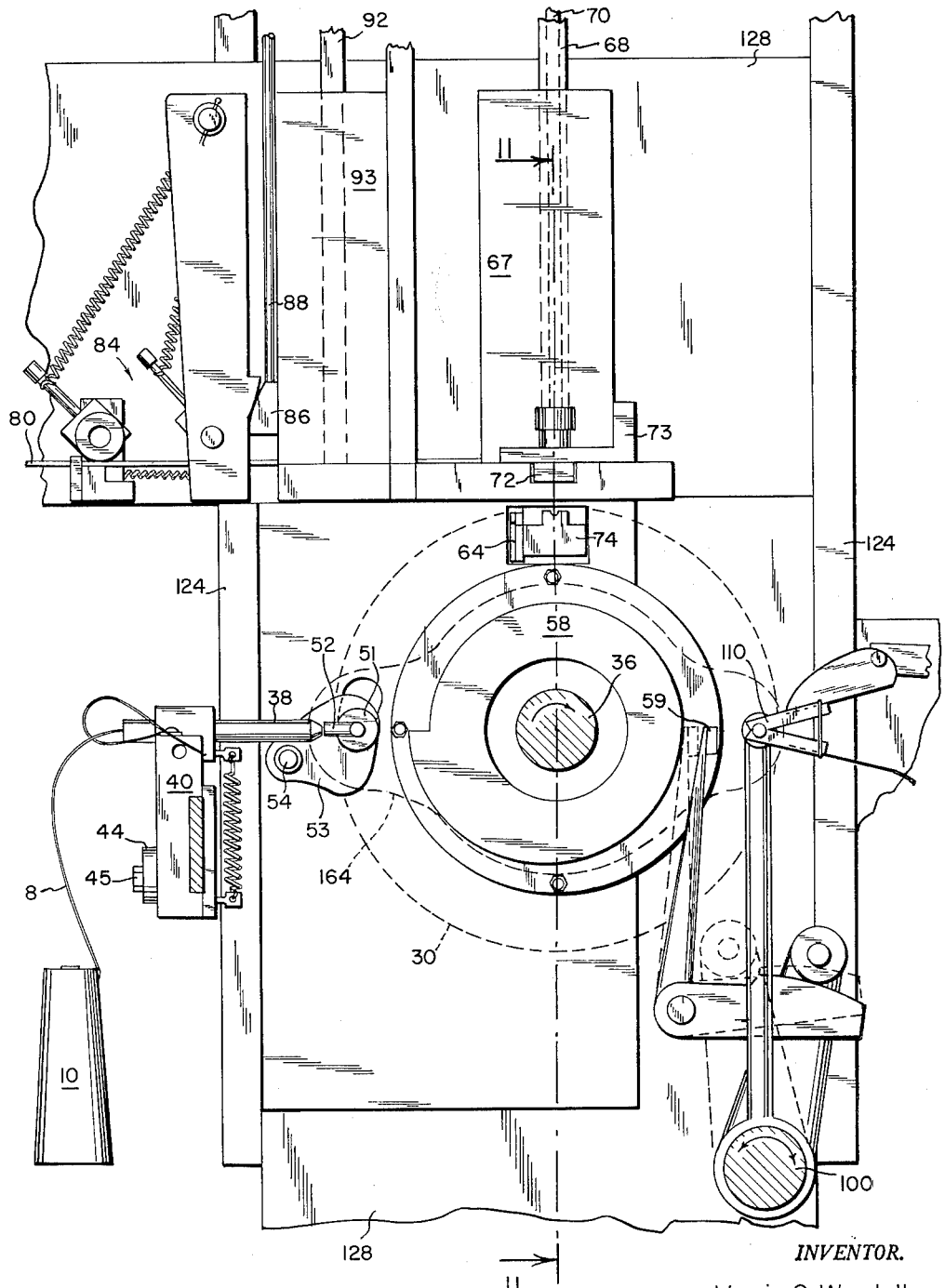
FIGURE 9 is a front view of a portion of the machine taken as indicated by line 9—9 in FIGURE 8 with the reel shown in dotted line.

The operation of the grippers in holding the elastic cord on the reel can be more easily understood by reference to FIGURE 3. Herein is shown a front perspective view of the gripper wheel 32 with portions cut away to more clearly show the operation of the individual cord grippers 56. The gripper wheel is shown here with the upper or leading one of a pair 62 of grippers closed and the lower or trailing one open to receive a portion 61 of the elastic cord on the forward movement of the cord guide 12. The individual grippers are opened and closed by the action of fixed cam 58. As can be seen, at the next clockwise movement of the wheel in relation to the fixed cam the trailing gripper in pair 62 will close and engage portion 61 of the elastic cord after it has been wound on the reel. Each individual gripper is spring loaded by a tension spring 57 which causes it to remain closed until engaged by the fixed cam 58 or by a movable gripper pusher 59. The latter as seen in FIGURES 3 and 9 is positioned between cam 58 and the rear ends of the grippers. This pusher 59 is periodically operated to open the grippers on the right side of reel 30 as the finished ties are ejected from the reel. As shown in FIGURE 3, the grippers positioned on the upper half of the circumference of wheel 32 are closed and engage portions of the elastic cord to hold it as shown in FIGURE 2. When a gripper pair reaches the tie removal station gripper pusher 59 engages the bases of the grippers and opens them thereby releasing each elastic tie which is then ejected from the machine by tie removing means more fully described hereinafter.

Referring now particularly to the mechanism provided for forming and attaching the metal tips and as seen in FIGURE 2 and FIGURE 9 the mechanism includes five basic components: the strip feed 84 which advances the metal strip 80 into the mechanism; the punch 92 and die 94 which stamp out the proper pattern in the metal strip; the tip shear member 68 which shears off a portion of the patterned metal strip; the former 72 over which the sheared portion is partially formed; and the hammer 70 which is journalled within the shear member and which in conjunction with the anvil, not shown in FIGURE 2, completes the formation of a tip around an end of the elastic cord.

Figure 4A:
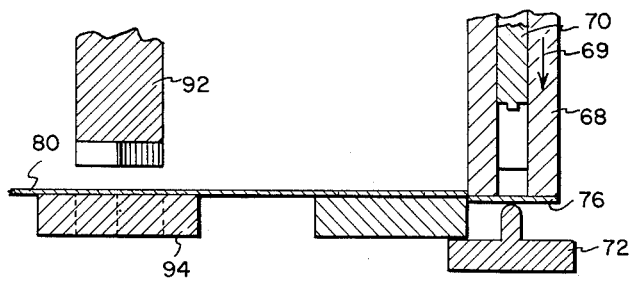
FIGURES 4a, 4b and 4c are front section views of the tip or barb forming and attaching mechanism illustrating the process of forming and attaching the tips to the cord ends.
Figure 5:
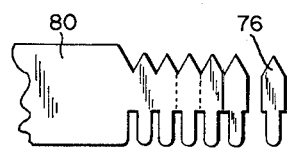
FIGURE 5 is a top view of a portion of the metal strip from which the tips are formed and showing the pattern stamped thereon by the operation of the punch and die elements.
Figure 4B:
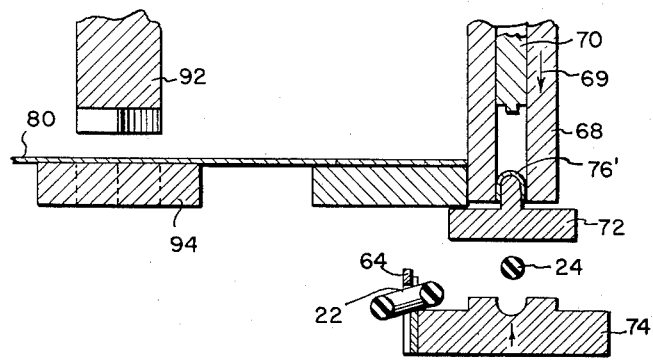
Figure 4C:
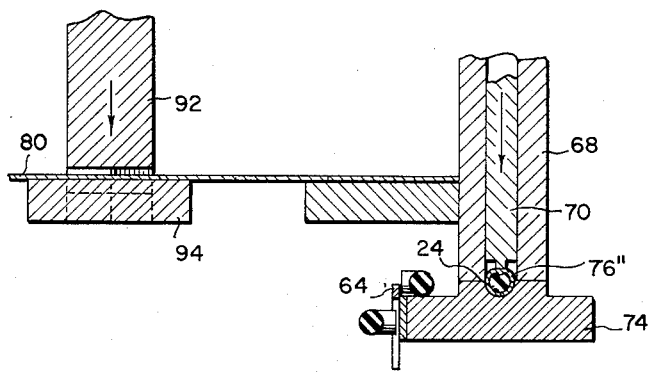

The steps of forming and attaching the metal tip can best be seen in FIGURES 4a, 4b, and 4c wherein are shown sectional views of some of these components at various steps in the formation and attaching of the metal tips. In FIGURE 4a the shear member 68 has just sheared from the metal strip a portion thereof, which constitutes a tip blank 76, the exact shape of which is indicated in FIGURE 5. As can be seen the former 72 is positioned directly under the tip blank.

Figure 6:
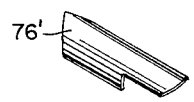
FIGURE 6 is a perspective view of a partially formed tip.
Figure 7:
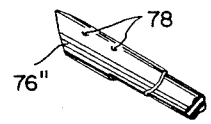
FIGURE 7 is a perspective view of a completely formed tip attached to the end of a segment of elastic cord.

As the shear continues its downward movement, indicated by the arrow 69, the tip blank is bent into a U-shape by the interaction of the shear member 68 and the former 72 as indicated in FIGURE 4b. At this point the former 72 is withdrawn forwardly from engagement with the shear member to a position as shown in FIGURE 2. As seen in FIGURE 4b the partially formed tip 76', having a generally U-shaped cross section (see FIGURE 6) remains lodged in the shear member 68, being held therein by spring action. As the former 72 is withdrawn, the anvil 74 begins to move upward in timed relation to the resumption of the downward movement of the shear member. An elastic cord end 24 is positioned between the converging shear member and anvil so that, as the shear member and anvil meet, the tip blank embraces the cord end and is then clinched thereon by the interaction of the hammer 70 and the anvil 74 as indicated in FIGURE 4c. The hammer, which is journalled in the shear member moves downward against the top of the partially formed tip 76' causing the ends thereof to be bent inward in conformance with the half circular cross section configuration of the anvil, and simultaneously forcing the tip out from shear 68. The hammer in this final clinching of the tip makes several small indentations 78 (see FIGURE 7) on the upper surface of the finished tip 76", which in combination with the clinching, insure a secure joining of the tip to the elastic cord.

Referring to FIGURES 4b and 4c, the cord or scissors 64 is attached to the left side of the anvil 74. As the anvil moves upward in forming a tip, the scissors is operated to cut the next succeeding cord loop 22 at the midpoint thereof. These newly formed ends will next receive tips. It should be noted that the scissors is operated every time a tip is attached to a cord end but, due to the fact that two ends are formed each time a loop 22 is cut by the scissors, the loops 22 are positioned so that one is cut at every other operation of the scissors.

Now, referring again to FIGURE 2, the operation of the tip forming and attaching mechanism in relation to the intermittent revolution of the reel can be understood. As was explained above, reel 30 is rotated in measured steps as the elastic cord is wound thereon. As the reel rotates the cord loops 22 advance step-by-step to the scissors 64. While the movement of the reel is arrested between steps, this scissors operates to cut each cord loop 22 at its midpoint, thus forming two cord ends. At the next stepped revolution of the reel one of the cord ends is brought into position between the converging shear member and anvil and a tip is attached thereto as shown in FIGURES 4b and 4c. At the next stepped revolution of the reel the other cord end formed by the cutting of the loop is brought into position and a tip is attached thereto concurrent with the cutting of the next loop by the scissors 64.

In FIGURE 2 the tip forming and attaching mechanism is operated by the pivot arms 114, 116 and 118 which are shown partially broken away. These pivot arms are caused to pivot on their respective shafts 120 and 122 by a cam mechanism not shown here but fully explained later. It will suffice to say here that the movement of the pivot arms as well as the reciprocating movement of the former 72 and its supporting arm 73 is in timed relation to the stepped revolution of the reel 30.

FIGURE 8 is a side view of the machine showing its overall appearance. As seen here, the machine comprises side plates 124 and end plate-legs 126 and 128 which form a rectangular housing, indicated generally at 123 wherein is contained caming means, more fully described hereinafter. The end plate-legs 126 and 128 extend downward to a base plate 130 to support the mechanism. The longitudinal extension member 138 supports reel 30 on its shaft 36 and a rocker shaft 100 which controls the tie ejecting mechanism to be described later. Mounted on base plate 130 is an electric motor 132 which by means of a belt 133 turns a pulley 134.

The tip forming and attaching mechanism, indicated generally at 66 and described above, is operated by means of pivot arms 114, 116 and 118 which are pivotally mounted on shafts 120 and 122, which shafts are supported by the vertical extensions 125 of the side plates 124. To the ends of the pivot arms 114, 116 and 118 are attached, respectively, push rods 115, 117 and 119 which are associated with a caming means located inside housing 123.

The cord guide 12 is connected to rotating crank 48 by means of the connecting rod 44 which is adjustable in length. On crank 48 is a crank pin 46 which engages the end of push rod 44 and is adapted to be variably positioned on crank 48. Thus, by varying the position of crank pin 46 and the length of connecting rod 44, the reciprocating stroke of cord guide 12 can be precisely determined.

FIGURE 9 is a front view of the machine, taken as indicated by line 9—9 in FIGURE 8. Herein can be seen the means for removing the fastening ties from the reel. The reel is indicated at 30 by a broken line. While the reel is stationary the grippers on the right side of the gripper wheel are pushed out as described above, by gripper pusher 59 thus releasing the fastening ties which are then engaged by the tie remover 110 and ejected from the reel. As can be seen both the gripper pusher 59 and tie remover 110 are operated by means of their respective connections to rocker shaft 100 (see also FIGURE 8) which is rocked back and forth as indicated by the arrow, in timed relation to the stepped revolution of the reel so that the removing mechanism operates only after every second movement of the reel.

The shear member 68 and the hammer 70 journalled therein are shown with the top portions thereof broken away and with the lower portions encased in guide 67 which is adapted to properly align them with the anvil 74. The punch 92 is also shown with its upper portion broken away and its lower portion enclosed in an aligning guide 93. The strip feed, indicated generally at 84, is a "hitch feed" type well known in the art and is therefore not described in detail. This mechanism feeds strip 80 stepwise to the right in precisely measured increments and is operated by cam 86 which is operatively connected to the punch 92 by push rod 88 and linkage 90 as shown in FIGURE 2.

Figure 10:
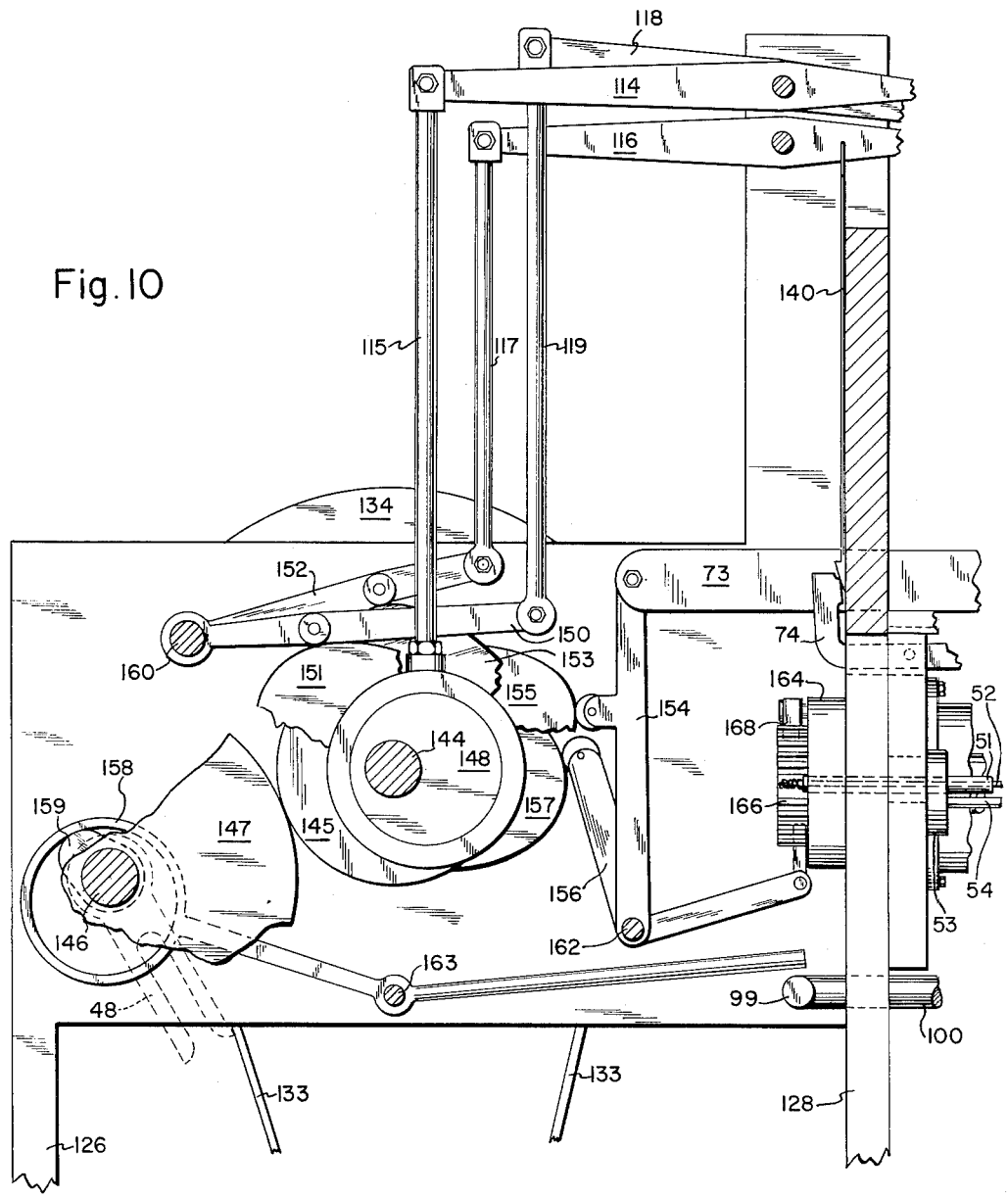
FIGURE 10 is a side view of a portion of the machine with the side plate removed to show the operating mechanism.

FIGURE 10 is a side view of a portion of the machine, as shown in FIGURE 8 with one of the side plates 124 removed to expose the caming means contained within the housing 123. Pulley 134 which is driven by belt 133 is attached to shaft 144, thus when the motor is operating shaft 144 is caused to rotate continuously. Shaft 144 is operatively connected to second shaft 146 by means of gears 145 and 147 so arranged that shaft 146 makes one revolution for every two revolutions of shaft 144. As may be understood from the description given above, the tip forming and attaching mechanism must operate twice for every one cycle of operation of the cord guide 12 and of the tie removing mechanism. Therefore, the cord guide and the tie removing means are operated by means associated with shaft 146 and the reel and the tip forming and attaching mechanism are operated by means associated with shaft 144.

To shaft 144 is attached the punch eccentric 148, the hammer cam 151, the shear member cam 153, the former cam 155, and the reel cam 157. The punch eccentric is adapted to rock pivot arm 114 by means of connecting rod 115 and thereby operate the punch 92 which is connected to pivot arm 114. Associated with the hammer cam 151 and the shear cam 153 are cam follower arms 150 and 152 respectively. These cam followers are pivoted at one end on stationary shaft 160 and connected to push rods 119 and 117 at their other ends. Thus as shaft 144 is rotated a reciprocating motion is imparted to push rods 117 and 119 which in turn impart a rocking motion to pivot arms 116 and 118 which operate the shear member 68 and the hammer 70.

Former cam 155 is associated with cam follower 154 which is pivoted at one end on shaft 162 and attached to former arm 73 at its other end. As shaft 144 is rotated cam follower 154 imparts a reciprocating movement to connecting arm 73 which carries former 72.

Reel cam 157 is associated with the L-shaped cam follower 156 which is pivoted on shaft 162 and attached to rocker plate 164 at one side thereof. The rocker plate is adapted to pivot on the reel shaft 36 which is journalled through the rocker plate. As can be seen in FIGURES 10 and 11 the rocker plate 164 is positioned between the ratchet gear 166 attached to the end of the reel shaft 36 and the inside surface of the end plate-leg 128. The rocker plate is rocked back and forth on shaft 36 in response to the movement of cam follower 156 as shaft 144 is rotated. The rocker plate has mounted thereon a pawl 168 which is adapted to engage the ratchet gear 166 attached to the end of reel shaft 36. As the plate is rocked by the action of the cam follower 156 the pawl repeatedly engages the ratchet gear thus imparting stepped revolution to the reel shaft 36.

In addition to controlling the revolution of the reel the rocker plate 164 controls the movement of the dancer finger 52 and the hammer 54. As described above and with reference to FIGURE 2, the dancer finger 52 must receive a loop of the elastic cord which is formed around it, move with the loop as the reel revolves until both of a pair of grippers have closed, pull out of that loop and then return to the position to receive the next loop to be formed around it. Now, the dancer finger 52 is journalled through a tube 51 which is rigidly attached to the rocker plate 164 and extends through an opening in the side plate 128 (see FIGURE 9). Each time the rocker plate rocks the reel rotates a portion of a revolution (as described above) and the dancer finger 52 moves up and down on an arc a distance corresponding to the distance the reel advances. The dancer finger is spring loaded so that it tends to resist rotative movement in relation to tube 51. As the loop of cord is formed the dancer finger moves upward on an arc corresponding to the movement of the reel. The rocker plate 164 then rocks the other way and the tube 51 returns to its original position.

The dancer finger rotates within the tube so that its end still remains in the just formed loop. At the next movement of the reel the loop is further rotated to a point where the tip of the spring loaded dancer finger pulls out of the loop and returns to its original position, as shown in FIGURE 9, where it will receive the next loop of the elastic cord.

As can best be seen in FIGURES 2 and 9, the bouncer 54 is rigidly connected to tube 51 by connecting member 53. Thus, the dancer finger 52 and bouncer 54 move up and down together and the bouncer is enabled to deflect the end of the pivoted cord feeding tube 38 as described above.

Attached to shaft 146 is cam 159 and crank 48. Associated with cam 159 is cam follower 158, which is pivoted on stationary shaft 163 and adapted to impinge on the offset portion 99 of shaft 100. Thus, when shaft 146 is rotated cam follower 158 strikes the offset portion of shaft 100 thereby imparting a rocking motion to said shaft.

FIGURE 11 is a cross-section view taken as indicated by line 11—11 in FIGURE 9 showing the detailed construction of various components. The anvil extends through an opening in the end plate-leg 128 and is pivotally mounted at 142. The anvil is caused to pivot by the operation of wedge cam 140 which is attached to pivot arm 116, the latter operating the shear member 68 so that as the shear member moves downward the anvil moves upward as described above.

The above description of the invention is intended in illustration and not in limitation thereof. Various changes may occur to those skilled in the art and these may be made without departing from the spirit or scope of the invention as set forth.

I claim:

1. In an arrangement for making elastic fastening ties, a revolvable reel assembly, means for rotating said reel assembly, a cord guide adapted to wind elastic cord on the reel assembly, means for imparting to the cord guide a reciprocating movement in timed relation to the rotation of the reel assembly whereby the elastic cord is wound onto the reel in a sinuous configuration, means associated with the reel assembly to receive and retain the elastic cord in said sinuous configuration as the reel assembly is rotated, cord shear means to successively sever the cord retained on the reel assembly into a plurality of U-shaped segments of uniform length, tip attaching means to attach a tip to each end of said U-shaped cord segments in sequence, and means operative to remove the finished cord segments from the reel assembly.

2. A machine for making fastening ties from a substantially continuous length of elastic cord including a rotatable reel assembly, means for rotating the reel assembly about an axis, a cord guide movable parallel to said axis, operative means for imparting to the cord guide a back and forth reciprocating motion in timed sequence to the intermittent revolution of the reel assembly and adapted to wind the elastic cord onto the reel assembly in a sinuous form, means associated with said reel assembly operative to engage the cord as it is wound on said reel assembly and retain it thereon for a portion of the revolution of the reel, a cord shear, means to operate the cord shear in timed relation to the revolution of the reel assembly whereby the cord is severed at uniform intervals and retained on the reel in a plurality of generally U-shaped segments, tip attaching means including a hammer and anvil arrangement for attaching tips to the ends of the U-shaped cord segments in timed relation to the rotation of said reel assembly, and means for removing the finished segments of elastic cord from the reel assembly.

References Cited in the file of this patent

UNITED STATES PATENTS

| | | | |
|---|---|---|---|
| 979,168 | Joslin | Dec. 20, | 1910 |
| 1,523,529 | Hultman | Jan. 20, | 1925 |
| 1,690,865 | Kondolf | Nov. 6, | 1928 |
| 1,812,646 | Burd | June 30, | 1931 |
| 2,339,410 | Keller | Jan. 18, | 1944 |
| 2,399,631 | Gartner | May 7, | 1946 |
| 2,613,427 | Adams | Oct. 14, | 1952 |
| 2,804,622 | Winberg | Sept. 3, | 1957 |
| 2,942,793 | Moore | June 28, | 1960 |
| 2,954,599 | Cootes | Oct. 4, | 1960 |